United States Patent
Neumann et al.

(10) Patent No.: US 7,873,690 B2
(45) Date of Patent: Jan. 18, 2011

(54) METHOD FOR MANAGING REQUESTS FOR OBTAINING PEER IDENTIFIERS TO ACCESS STORED CONTENTS IN P2P MODE, AND ASSOCIATED MANAGEMENT DEVICE AND NETWORK EQUIPMENT

(75) Inventors: Christoph Neumann, Rennes (FR); Xavier Lebegue, Jouy-En-Josas (FR)

(73) Assignee: Thomson Licensing, Boulogne-Billancourt (FR)

( * ) Notice: Subject to any disclaimer, the term of this patent is extended or adjusted under 35 U.S.C. 154(b) by 148 days.

(21) Appl. No.: 12/380,822

(22) Filed: Mar. 4, 2009

(65) Prior Publication Data
US 2009/0234918 A1 Sep. 17, 2009

(30) Foreign Application Priority Data
Mar. 14, 2008 (FR) .................................. 08 51647

(51) Int. Cl.
*G06F 15/16* (2006.01)
(52) U.S. Cl. ..................................... 709/200; 707/999.1
(58) Field of Classification Search ......... 709/200–202; 707/999.1
See application file for complete search history.

(56) References Cited

U.S. PATENT DOCUMENTS

| 2005/0120031 A1* | 6/2005 | Ishii ........................... 707/100 |
| 2007/0044159 A1* | 2/2007 | Ishiguro ...................... 726/27 |
| 2007/0110047 A1* | 5/2007 | Kim ........................... 370/389 |
| 2008/0104219 A1* | 5/2008 | Kageyama et al. .......... 709/223 |
| 2010/0110935 A1* | 5/2010 | Tamassia et al. ............ 370/256 |

FOREIGN PATENT DOCUMENTS

WO WO 03/005244 1/2003

OTHER PUBLICATIONS

Kangasharju J et al: "Locating Copies of Objects Using the Domain Name System" Proceedings of the International Caching Workshop, XX, XX, Jan. 1, 1999, pp. 1-12, XP002197618 Abstract Section 2.

(Continued)

*Primary Examiner*—Moustafa M Meky
(74) *Attorney, Agent, or Firm*—Robert D. Shedd; Joseph J. Opalach; Jerome G. Schaefer

(57) ABSTRACT

A management device (D) that is part of a communication network (R1) to which can be connected items of communication equipment (T1-T4) constituting peers storing content data and operating in P2P mode. This device (D) comprises analysing means (MA) adapted to, in the case of reception of a request for obtaining peer identifiers, said request designating content, from a peer (T1), i) to access a tree structure comprising leaves (associated with peer identifiers storing content associated with content identifiers) and location nodes (associated with location information, representative of location of peers associated with leaves that are attached to them, and with content information, representative at least of content identifiers that store these peers), in order to determine the location of the leaf associated with the content identifier designated in the received request, then the peer identifiers associated with leaves that are attached to this determined location node and said content identifier, and ii) order the transmission to the requesting peer (T1) of the determined peer identifiers.

17 Claims, 1 Drawing Sheet

OTHER PUBLICATIONS

Lechang Cheng, Mabo R. Ito and Norm Hutchinson: "Internet Topology Based Identifier Assignment for Tree-Based DHTs" LE Jan. 14, 20099 New Technologies, Mobility and Security, [Online] Nov. 13, 2007, pp. 607-616, XP002510201 Springer Netherlands ISBN: 978-1-4020-6270-4 Extrait de l'Internet: URL:http//www.springerlink.com/> [extrait le Jan. 14, 2009] Abstract Section 3.

Search report dated Jan. 14, 2009.

* cited by examiner

METHOD FOR MANAGING REQUESTS FOR OBTAINING PEER IDENTIFIERS TO ACCESS STORED CONTENTS IN P2P MODE, AND ASSOCIATED MANAGEMENT DEVICE AND NETWORK EQUIPMENT

This application claims the benefit, under 35 U.S.C. §119, of European Patent Application No. 0851647 of 14 Mar. 2008.

SCOPE OF THE INVENTION

The invention relates to communication networks to which are connected items of communication equipment capable of storing content data, possibly multimedia, and of exchanging this content data in P2P (Peer-to-Peer) mode.

The invention relates to all communication networks (or infrastructures), wired or wireless, capable of transmitting content data (possibly multimedia) between items of user's communication equipment constituting peers. It can therefore be a wired network, such as a high or medium bitrate transmission line network, such as for example xDSL (x Digital Subscriber Line) type lines or cables or even optical fibres, or a wireless network (for example of mobile or cellular type) or of local type (standards WLAN (Wireless Local Area Network)—IEEE 802.11a, Wi-Fi (802.11g), ETSI HiperLAN/2), and WiMAX (IEEE 802.16, ETSI HiperMAN)). Generally, the invention applies to all networks using a routing protocol based on IP (Internet Protocol).

Moreover, "communication equipment" is understood to mean any type of communication equipment being part of, or that can be connected to a wired or wireless communication network. It can therefore be, for example, mobile (or cell) or fixed telephones, fixed computers or PDAs (Portable Digital Assistant) including "pocket PCs", content receivers (such as for example decoders, residential gateways or STBs (Set-Top Boxes)) as long as they are equipped with communication means to exchange content data.

In addition, "content" is understood here to mean a set of data that defines a television or video or audio programme (radio or musical) or games or multimedia, or again a computer file (data).

PRIOR ART

A person skilled in the art knows that it is possible to constitute a P2P overlay network with user items of communication equipment that constitute peers and that are connected to one or more communication networks while being connected to each other by logical or virtual links.

It is recalled that a P2P network in particular enables peers searching for content to retrieve content data from at least one other peer that stores said content data and for which the peer identifier was previously communicated.

An overlay network is said to be "friendly" when it minimizes the P2P traffic between peers connected to different (communication) networks (that is managed by different (for example ISP type) service providers). This definition results from the fact that it costs less for a service provider (or ISP) to transport traffic within its own network than to have this traffic transported by networks belonging to other service providers.

For an overlay network to be considered as friendly, it must therefore enable peers to recover as often as possible the content data that interests it from peers known as neighbouring peers (that is connected to the same network as their own). In other words, the distances between the peers must be minimized ("distance between peers" is understood here to be the number of network elements (logical or physical) traversed to reach another peer). In order to reach this objective, it is possible for example to implement in a P2P network distributed content servers (for example of "CacheLogic" type) that constitute peers and have (very) large storage capacities. But this solution may be very expensive.

Numerous other solutions have been proposed, such as for example those relying on the use of tables known as DHT (Distributed Hash Table) tables. Likewise, some protocols enabling selection of peers by being based on their IP addresses, and more specifically enabling selection of those that have the closest addresses to other peers (for instance due to the fact that they belong to the same sub-network).

However, none of the previously mentioned solutions is really satisfactory, particularly due to the fact that they do not enable the easy location of the closest peers and therefore of the addresses where the contents are stored. Notably, no solution enables the construction of a true logical view of the P2P network and the selection of the most appropriate peers for other peers.

The prior art also knows, through the PCT patent application WO 03/005244 (Intel), a method and apparatus for peer-to-peer services.

SUMMARY OF THE INVENTION

The object of the invention is therefore to improve the situation.

For this purpose, the invention first proposes a method for managing requests to obtain peer identifiers, constituted by items of communication equipment storing content data, connected to at least one communication network and operating in peer-to-peer (P2P) mode, and consisting, in the case of reception of a request designating content, from a peer:

determining the location of a leaf that is associated with this requesting peer among leaves of a tree-structure in which the leaves are associated respectively with the peer identifiers storing content data, said content being associated with content identifiers and attached to nodes known as location nodes that are associated with location information, representative of the location of peers associated with the leaves that are attached to them (possibly via at least another location node), as well as content information, representative of at least content identifiers that store said peers, then determining, through upwards movements along the tree structure starting from the identified leaf, the location node that is associated with the content information representative of the content identifier designated in the received request, then determining the peer identifiers that are associated with the leaves that are attached to this determined location node and associated with the content information representative of the content identifier designated in the received request, and transmitting to said requesting peer said peer identifiers thus determined.

The method according to the invention can comprise other characteristics that can be taken separately or in combination, and particularly:

the location information can be selected from (at least) an access network equipment identifier to which is attached a peer, the service provider of a peer and the country of the service provider of a peer, content information can be representative of a content identifier and supplementary information that are selected from (at least) the quantity of content data stored by a peer and the content part stored by a peer, the location nodes of the tree structure can represent physical or logical objects selected from (at least) the items of equipment of the access network to which the peers are attached, the service providers and the country of the service provider, a location node of the tree structure can be known as the "child" of a location node known as the "parent" if it is associated with location information that is more specific than that of the parent location node, some at least of the location nodes can be associated with a number that is equal to the number of leaves that are attached to it and that are associated with the same content identifier, when a peer connects for the first time, its location information and content information representative of content that it is storing can be determined, then the tree structure can be adapted according to this information and content information can be determined.

The invention also relates to a management device for an item of network equipment for a communication network to which items of communication equipment can be connected constituting peers, storing data contents and operating in peer-to-peer (P2P) mode.

This management device is characterized by the fact that it comprises analyzing means (MA) adapted to, in the case of reception from a peer of a request designating content:

accessing a tree structure comprising leaves, respectively associated with peer identifiers storing the content data associated with the content identifiers, and nodes known as location nodes, associated with location information, representative of the location of peers associated with the leaves that are attached to them (possibly via at least one other location node), and to content information, representative of at least content identifiers storing these peers, in order to determine the location of a leaf that is associated with this requesting peer, then to determine, through upwards movements along the tree structure starting from the identified leaf, a location node associated with the content information representative of the content identifier designated in the received request, then the peer identifiers associated with the leaves that are attached to this determined location node and associated with the content information representative of the content identifier that is designated in the request, and ordering the transmission to the requesting peer of the determined peer identifiers.

The device according to the invention can comprise other characteristics that can be taken separately or in combination, and particularly:

it can comprise storage means storing the tree structure, it can comprise processing means adapted to constitute and adapt the tree structure, the processing means can be adapted to, when a peer connects for the first time, determine its location information and content information representative of content that it is storing, then adapt the tree structure according to this determined location information and content information.

the processing means can be adapted to determine the number of leaves that are attached to at least some of the location nodes and associated with the same content identifier, then to associate with each of these location nodes the number of corresponding leaves.

The invention also proposes an item of network equipment, intended for connecting to a communication network, and equipped with a management device of the type presented above.

BRIEF DESCRIPTION OF THE DRAWINGS

Other characteristics and advantages of the invention will appear upon examination of the detailed description hereafter, and the annexed drawings, wherein.

The annexed drawings can not only serve to complete the invention, but also contribute if necessary, to its definition.

DETAILED DESCRIPTION

The purpose of the invention is to enable the constitution of P2P type overlay networks of "friendly" character.

Figure 1:
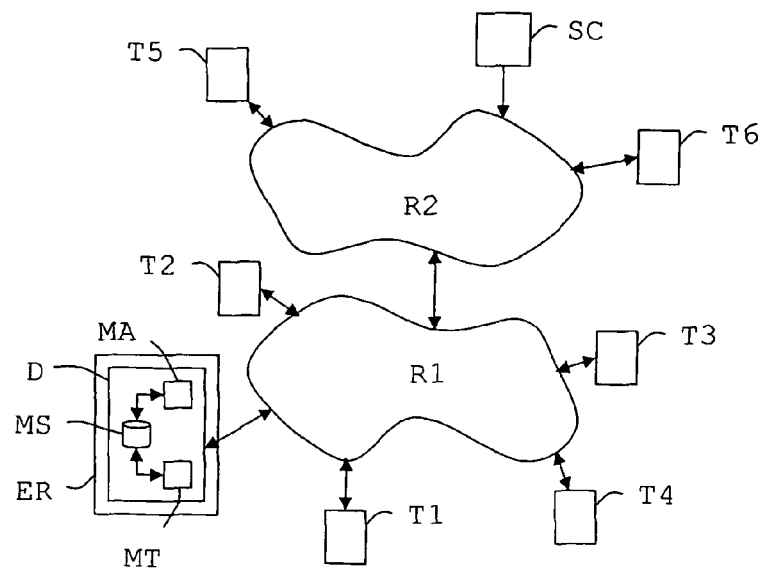
FIG. 1 shows very diagrammatically and functionally the items of communication equipment of peers connected to two communication networks, as well as an item of network equipment according to the invention connected to one of these communication networks and equipped with a management device according to the invention, and FIG. 2 diagrammatically shows an example of a tree structure.

FIG. 1 diagrammatically shows two communication networks R1 and R2 to which are connected the items of communication equipment Ti of the users that constitute the peers. The index i here takes values comprised between 1 and 6, but it can take any value greater than or equal to 2.

In this non-restrictive example, the items of communication equipment T1 to T4 are connected to the first (communication) network R1, while the items of communication equipment T5 and T6 are connected to the second (communication) network R2.

It is important to note that the invention also applies when the number of interconnected (communication) networks is greater than two.

In the following, it is considered in a non-restrictive example that the first (communication) network R1 and the second (communication) network R2 are wired networks (for example of ADSL type) offering an IP access. However, the invention is not limited to this kind of communication network. It relates in fact to all communication networks (or infrastructures), wired or wireless, capable of transmitting content data (possibly multimedia) between items of communication equipment constituting peers. It could therefore concern wired networks, such as cable or fibre-optic networks, or wireless networks (for example of mobile or cellular type or local type (WLAN and WiMAX standards)).

It will be noted that the invention can concern situations where the interconnected networks are of different types, as it can concern situations where the interconnected networks are of the same type.

Account taken of the preceding illustrative choice, it is to be considered in the following, being a non-restrictive example, that the items of (communication) equipment Ti of peers are fixed or portable computers. But the invention is not limited to this type of (communication) equipment. It relates in fact to all types of communication equipment capable of exchanging content data, by wired or wireless paths, with another item of communication equipment, via at least one (communication) network and in P2P mode. It can therefore be, for example, mobile (or cell) or fixed telephones, PDAs (Portable Digital Assistant) including "pocket PCs", content receivers (such as for example decoders, residential gateways or STBs (Set-Top Boxes) as long as they are equipped with communication means to exchange content data.

Finally, it is considered in the following, non-restrictive example, that the contents that are partially or completely stored by the items of equipment Ti are television programmes (video) that are for example from a content server (SC) and that have been broadcast via the second network R2 (thus behaving as the broadcast network). But the invention is neither limited to this content type, nor to this content transmission mode. It relates in fact to all content types constituted of a set of data that can be transmitted (possibly diffused in "broadcast" mode) by a communication network, possibly in the form of packets (possibly multiplexed). It could therefore also relate to audio content, as for example audio programmes (radio or music), games, multimedia content or again computer files (or "data").

It will be noted that the content could for example be broadcast to items of equipment Ti as a stream and directly in the context of an on-demand video (VOD) service or as a programme broadcast service (for example television or radio or music) or as files (or data).

The invention proposes a method for managing requests for obtaining peer identifiers that are generated by the items of equipment Ti when they wish to retrieve content data stored by the items of equipment Ti of other peers. In the following, an item of equipment Ti is assimilated to the peer that it constitutes within a P2P network.

The method according to the invention comprises three main steps.

A first main step (i) is carried out each time an item of equipment (or peer) Ti transmits to the network (R1 or R2) to which it is connected, a request for obtaining peer identifiers that designates a content (for example via a content identifier).

This first main step consists in localising in a tree structure, constituted of leaves Fi and nodes NLj, a leaf Fi that is associated with the peer Ti that generated and transmitted the request (for obtaining peer identifiers).

This tree structure represents the topology of interconnected networks (here R1 and R2) to which are connected the items of equipment of the peers Ti. A very simple non-restrictive example of tree structure is diagrammatically shown in FIG. 2.

Figure 2:
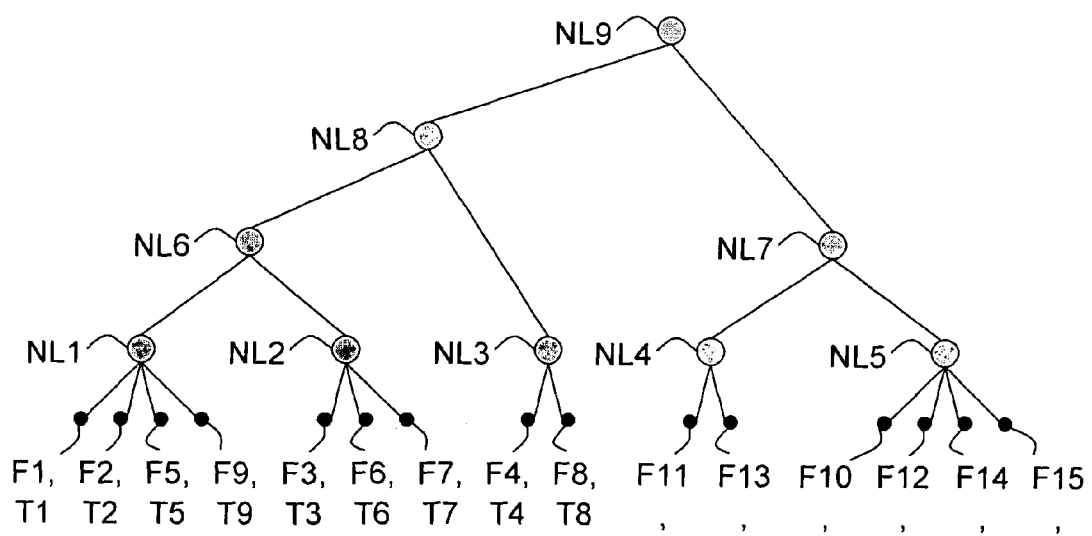

The lowest level of the tree structure is constituted of leaves Fi that are respectively associated with peer identifiers Ti that store content data which is respectively associated with the content identifiers. In the example of FIG. 2, the (first) lowest level of the tree structure comprises fifteen leaves F1 to F15 respectively associated with fifteen peers T1 to T15. It is noted that a leaf Fi is associated with a unique peer identifier, but it can be associated with more than one content identifier if the peer Ti with which the identifier is associated itself stores at least part of each of these contents.

The higher levels of the tree structure are constituted of location nodes NLj that are directly or indirectly attached (that is via at least one other location node NLj' of a lower level), to at least one leaf Fi. Each location node NLj is associated, in part, with location information that is representative of the location of peers Ti that are associated with leaves Fi that themselves are (directly or indirectly) attached, and, in another part, to content information that is representative at least of content identifiers of content that is stored by these peers Ti.

In the example of FIG. 2, the second level of the tree structure (situated above the leaves Fi) comprises five location nodes NL1 to NL5. The location node NL1 is directly attached to the leaves F1, F2, F5 and F9, which signifies that it is associated with location information and content information concerning the peers T1, T2, T5 and T9. The location node NL2 is directly attached to the leaves F3, F6, and F7, which means that it is associated with location information and content information concerning the peers T3, T6, and T7. The location node NL3 is directly attached to the leaves F4 and F8, which signifies that it is associated with location information and content information concerning the peers T4 and T8. The location node NL4 is directly attached to the leaves F11 and F13, which signifies that it is associated with location information and content information concerning the peers T11 and T13. The location node NL5 is directly attached to the leaves F10, F12, F14 and F15, which signifies that it is associated with location information and content information concerning the peers T10, T12, T14 and T15.

The third level of the tree structure (located above the location nodes NL1 to NL5) comprises two location nodes NL6 and NL7. The location node NL6 is directly attached to the location nodes NL1 and NL2, which signifies that it is associated with location information and content information concerning the peers T1, T2, T3, T5, T6, T7 and T9. The location node NL7 is directly attached to the location nodes NL4 and NL5, which signifies that it is associated with location information and content information concerning the peers T10 to T15.

The fourth level of the tree structure (located above the location nodes NL6 and NL7) comprises a single location node NL8. This location node NL8 is directly attached to the location nodes NL3 and NL6, which signifies that it is associated with location information and content information concerning the peers T1 to T9.

Finally, the fifth level of the tree structure (located above the location node NL8) comprises a single location node NL9. This location node NL9 is directly attached to the location nodes NL7 and NL8, which signifies that it is associated with location information and content information concerning the peers T1 to T15.

Preferably, a location node NLj of the tree structure is a "child" of a location node known as a "parent" location node NLj' (located at the next level above) if it (NLj) is associated with location information that is more precise than that associated with said parent location node NLj'.

The location information that is associated with location nodes NLj is selected from (at least) one network access item of equipment identifier to which is attached a peer Ti, such as for instance a base station identifier (BS, BTS or Node B in a radio network) or from a DSLAM multiplexer (in an xDSL type wired network), the service provider of a peer Ti, such as for instance the ISP to which its user is a subscriber, the country of the service provider of a peer Ti, and the world region comprising the country of the service provider of a peer Ti.

The content information is at least representative of a content identifier. But, it can also (and in complement) be representative of complementary information that is for instance selected from (at least) the quantity of content data that is stored by a peer Ti and the part of a content that is stored by a peer Ti.

Moreover, the location nodes NLj of the tree structure representing the physical or logical objects that can for example be selected from (at least) the access network items of equipment to which are attached the peers Ti (base station or DSLAM multiplexer for example), the service providers of peers Ti, the countries of the service providers, and a logical grouping of network elements or AS (Autonomous System).

For instance, in the example of FIG. 2, the first level of location nodes (NL1 to NL5) can group access network items of equipment, the second level of location nodes (NL6 and NL7) can group the two service providers that manage the first R1 and the second R2 communication networks, the third level of location nodes (NL8) can comprise part of a country where the first network R1 (NL6) is present and another access network disposing of a single access network item of equipment (NL3), and the fourth level of location nodes (NL9) can comprise the countries where the first R1 and second R2 networks and the other access network are present.

It is noted that it is preferable to associate with each location node NLj a node identifier, but equally the node identifier with its parent location node NLj' and/or it child location nodes NLj" or leaves Fi in such a way to ease searches within the tree structure.

Moreover, it is noted that the first main step can be implemented by a management device D that can either be part of an item of network equipment ER connected to one of the communication networks R1 or R2 (here it is R1), as shown in a non-restrictive example on FIG. 1, or it can be connected to this item of network equipment ER so that it works for it, or again it can itself constitute an item of network equipment. This ER network item of equipment is for example a management server that is the destination of requests for obtaining peer identifiers that are generated and transmitted by items of equipment of peers Ti.

Such a management device D comprises an analysis module MA that is notably adapted to, when the network item of equipment ER receives a request from a peer Ti, said request designating a content, access the above-described tree structure in order to determine the location of the leaf Fi that is associated with this requesting peer Ti.

It is noted that the data that constitutes the tree structure is stored in the storage means MS that can be part of the management device D, as shown non-restrictively in FIG. 1, or can be part of the network equipment ER, or again can be part of another item of network equipment accessible from the network equipment ER via a communication network R1 or R2 (for example). These storage means MS can be presented in any form known to those skilled in the art, and particularly in the form of a database or a memory.

The second main step (ii) of the method according to the invention consists in, once the location of a leaf Fi has been determined within a tree structure, through upwards movements along the tree structure starting from the localised leaf Fi in order to determine a location node NLj that is associated with content information that is representative of the content identifier designated in the received request. Next, the peer identifiers Ti' are determined. These peer identifiers Ti' are associated with the leaves Fi' that are (directly or indirectly) attached to the location node NLj that was determined, they are associated with content information that is representative of the content identifier that is designated in the received request.

It is understood that it is preferable to determine a relatively high number of peers Ti' that store at least a part of a content that a requesting peer Ti wishes to at least partially retrieve. This enables the requesting peer Ti to dispose of a list of peers Ti' from which it can attempt to retrieve all or part of a content, and therefore to carry out several retrieval attempts from different peers if an attempt fails or if it does not allow retrieval of a part of the sought after content data.

For instance, a threshold value can be fixed for a minimal number of peer identifiers Ti' to be determined in the tree structure. In this case, if during the climb back up the tree structure a location node is determined NLj that is associated with a content identifier designated in the received request and that the number of leaves Fi that are attached to this location node NLj is higher than the threshold value, then the search in the tree structure is interrupted. However, if the number of leaves Fi attached to this location node NLj is less than the threshold value, then the higher level of the tree structure is accessed in order to determine if the parent location node NLj' is attached to a higher number of leaves Fi associated with the sought after content identifier. If the new number of leaves Fi is higher than the threshold value, then the search in the tree structure is interrupted. However, if the number of leaves Fi attached to this location node NLj' is still less than the threshold value, then the higher level of the tree structure is accessed in order to determine if the parent location node NLj' is attached to a higher number of leaves Fi associated with the sought after content identifier, and so on.

It is noted that the second main step can also be implemented by the management device D, and more particularly by its analysis module MA via a search within the tree structure data stored in the storage means MS.

If FIG. 2 is once again referred to, taking into account the selection carried out above for objects representing location nodes NLj, and if a peer T1 is searching for a content that is stored in the peers T3, T6, T8, T10 and T14, then the search in the tree structure can progress as indicated below.

The leaf F1 is then localised. This leaf F1 is associated with the peer T1 that requested a content associated with a content identifier IC4. Then, it is determined if the location node NL1 to which is attached the leaf F1 is associated with the content identifier IC4. As this is not the case in this example, it is determined if the parent location node NL6 to which is attached the location node NL1 is associated with the content identifier IC4. Such is the case here because (NL6) is attached to the location node NL2 that is attached to the leaves F3 and F6. For example, if the threshold value is equal to 4, then the climb back up the tree structure must be continued. It is then determined if the parent location node NL8 to which are attached the location nodes NL6 and NL3 enables reaching a higher number of leaves associated with the content identifier IC4. Such is the case here because it (NL8) is attached to the location node NL2 which is attached to the leaves F3 and F6, and to the location node NL3 which is attached to the leaf F8. The number (3) of leaves associated with the content identifier IC4 being still less than the threshold value (4), the climb up the tree structure is continued. It is then determined if the parent location node NL9 to which are attached the other location nodes NL1 to NL8 enables reaching a higher number of leaves associated with the content identifier IC4. Such is the case here because it (NL9) is attached to the location node NL2 which is attached to the leaves F3 and F6, and to the location node NL3 which is attached to the leaf F8 and to the location node NL5 which is attached to leaves F10 and F14. The number (5) of leaves associated with the content identifier IC4 being then higher than the threshold value (4), the climb up the tree structure is interrupted. It is then sufficient to determine the peer identifiers that are respectively associated with leaves F3, F6, F8, F10 and F14.

It is noted that it can be envisaged to position a filter prohibiting when possible the retention of peers that are not connected to the network to which is connected the requesting peer, in order to limit the P2P traffic cost.

A third main step (iii) of the method according to the invention consists in transmitting to the requesting peer Ti the peer identifiers Ti' that were determined during the second main step.

It is noted that this third main step can also be implemented by the management device D, and more specifically by its analysis module MA via the generation of a message containing the determined peer identifiers. It is understood that the analysis module MA commands its management device D to transmit the message to the requesting peer Ti. In the non-restrictive example shown in FIG. 1, it is then the network equipment ER that is in charge of this transmission via at least the first network R1.

It is also noted that the management device D can also be adapted to constitute and adapt the tree structure. To this purpose, it can comprise a processing module MT adapted to, each time a peer T1 connects for the first time in P2P mode, determine this location information (preferably the item of equipment of the access network to which it is attached, otherwise its service provider (ISP) or the country where the network of its service provider is operating) and the content information that is representative of the content it stores.

Several solutions can be implemented to obtain the location information. Hence, by providing an IP address to a service, this latter can return the country, the service provider (ISP), the AS, as well as possibly the associated DSLAM multiplexer. A service provider (ISP) can also provide information related to the architecture of its network, and a tree structure can be built from this information.

Then, the processing module MT adapts the tree structure according to this determined location information and content information. "Adapt the tree structure" is understood here to mean the act of defining a new leaf Fi (as well as possibly at least one new location node NLj), new leaf/node and or node/node associations, and new associations of location information and content information.

Moreover, it is noted that with the purpose of facilitating the search for leaves Fi within the tree structure, the processing module MT can be adapted to determine the number of leaves Fi that are attached to at least some location nodes NLj and that are associated with a same content identifier, then associate with each of these location nodes NLj the number of corresponding leaves. This enables to immediately determine if the parent location node that has just been reached enables access to a higher number of leaves than its child location node that has just been quitted.

It is noted that the management device D, according to the invention, and specifically its analysis module MA as well as its possible processing module MT and its possible storage means can be realized in the form of software modules. But, they can also be in part or entirely realized in the form of electronic circuits (hardware) or of a combination of software modules and electronic circuits.

The invention is not restricted to embodiments of the management device, network equipment and management method described above, provided only as a non-restrictive example, but includes all the variants that can be envisaged by those skilled in the art in the framework of the following claims.

The invention claimed is:

1. Method for managing requests for obtaining peer identifiers, constituted by communication equipment (Ti) storing content data, connected to at least one communication network (R1) and operating in peer-to-peer mode, consisting, in case of reception of a request for obtaining peer identifiers, said request designating content originating from a peer (Ti), in:
   i) determining the location of a leaf (Fi) associated to said requesting peer (Ti) among leaves of a tree structure, in which said leaves are respectively associated to identifiers of peers (Ti) storing content data, said content being associated to content identifiers and being attached to nodes called location nodes (NLj) associated to location information, representative of location of peers (Ti) associated to leaves (Fi) that are attached to them, and to content information, representative of at least content identifiers stored by said peers, then
   ii) determining, through upwards movements along the tree structure starting from the identified leaf (Li), a location node (NLj) associated to content information representative of the content identifier that is designated in said received request, then determining the identifiers of peers (Ti') associated to the leaves (Fi') that are attached to said determined location node (NLj) and that are associated to content information representative of the content identifier that is designated in said received request, and
   iii) transmitting to said requesting peer (Ti) said determined identifiers of peers (Ti').

2. Method according to claim 1, wherein said location information is selected from at least an access network equipment identifier to which is attached a peer (Ti), the service provider of a peer (Ti) and the country of the service provider of a peer (Ti).

3. Method according to claim 2, wherein said content information is representative of a content identifier and complementary information selected in a group comprising at least the quantity of content data stored by a peer (Ti) and the content stored by a peer (Ti).

4. Method according to claim 1, wherein said location nodes of the tree structure represent physical or logical objects selected in a group comprising at least items of equipment of the access network to which are attached said peers (Ti), service providers and the countries of the service providers.

5. Method according to claim 1, wherein a location node of the tree structure is a "child" of a location node known as a "parent" location node if it is associated with location information that is more specific than said parent location node.

6. Method according to claim 1, wherein at least some of said location nodes are associated with an equal number of leaves (Fi) that are attached to it and that are associated with a same content identifier.

7. Method according to claim 1, wherein, when a peer (Ti) connects for the first time, its location information and content information representative of content that it is storing is determined, then the tree structure is adapted according to this determined location information and content information.

8. Managing device (D) for communication equipment (ER) of a communication network (R1), to which communication equipment (Ti) can connect, said communication equipment constituting peers storing content data and operating in peer-to-peer mode, comprising analyzing means (MA) adapted to, in case of reception of a request for obtaining peer identifiers that designate content, originating from a peer (Ti),
   i) access a tree structure comprising leaves (Fi), respectively associated to identifiers of peers (Ti) storing content data associated to content identifiers, and location nodes (NLj), associated to location information, representative of location of peers (Ti) associated to leaves that are attached to them, and to content information, representative of at least content identifiers stored by said peers, in order to determine the location of the leaf (Fi) that is associated to said requesting peer (Ti), then to determine, through upwards movements along the tree structure starting from the identified leaf (Li), a location node (NLj) associated to content information representative of the content identifier that is designated in said received request, then the identifiers of peers (Ti') associated to the leaves (Fi') that are attached to said determined location node (NLj) and that are associated to content information representative of the content identifier that is designated in said received request, and ii) order the transmission of said determined identifiers of peers (Ti') to said requesting peer (Ti).

9. Device according to claim 8, wherein said location information is selected from a group comprising at least an access network equipment identifier to which is attached a peer (Ti), the service provider of a peer (Ti) and the country of the service provider of a peer (Ti).

10. Device according to claim 8, wherein said content information is representative of a content identifier and complementary information selected in a group comprising at least the quantity of content data stored by a peer (Ti) and the content stored by a peer (Ti).

11. Device according to claim 8, wherein said location nodes of the tree structure represent physical or logical objects selected in a group comprising at least items of equipment of the access network to which are attached said peers (Ti), service providers and the countries of the service providers.

12. Device according to claim 8, wherein a location node of the tree structure is a "child" of a location node known as a "parent" location node if it is associated with location information that is more specific than said parent location node.

13. Device according to claim 8, comprising storage means (MS) storing said tree structure.

14. Device according to claim 8, comprising processing means (MT) adapted to constitute and adapt said tree structure.

15. Device according to claim 14, wherein said processing means (MT) are adapted to, when a peer (Ti) connects for the first time, determine its location information and content information representative of content that it is storing, then to adapt the tree structure according to this determined location information and content information.

16. Device according to claim 14, wherein said processing means (MT) are adapted to determine the number of leaves (Fi) that are attached to at least some of said location nodes (NLj) and that are associated with the same content identifier, then to associate with each of these location nodes (NLj) said corresponding number of leaves.

17. Network equipment (ER), intended to be connected to a communication network (R1), comprising a management device (D) according to claim 8.

* * * * *